(12) United States Patent
Lin

(10) Patent No.: US 11,863,119 B2
(45) Date of Patent: Jan. 2, 2024

(54) SOLAR PANEL BRACKET WITH WATER CONDUCTING FUNCTION

(71) Applicant: HS Renewable Energy Co., Ltd., Tainan (TW)

(72) Inventor: Hung-Chun Lin, Tainan (TW)

(73) Assignee: HS Renewable Energy Co., Ltd., Tainan (TW)

(*) Notice: Subject to any disclaimer, the term of this patent is extended or adjusted under 35 U.S.C. 154(b) by 0 days.

(21) Appl. No.: 17/837,835

(22) Filed: Jun. 10, 2022

(65) Prior Publication Data
US 2023/0246588 A1    Aug. 3, 2023

(30) Foreign Application Priority Data
Jan. 28, 2022 (TW) .................................. 111104030

(51) Int. Cl.
*H02S 30/10* (2014.01)
*H02S 20/20* (2014.01)
(Continued)

(52) U.S. Cl.
CPC .............. *H02S 30/10* (2014.12); *H02S 20/20* (2014.12); *F24S 10/50* (2018.05); *F24S 10/74* (2018.05); *F24S 10/742* (2018.05); *F24S 25/00* (2018.05); *F24S 25/20* (2018.05); *F24S 25/40* (2018.05); *F24S 25/63* (2018.05); *F24S 25/67* (2018.05);
(Continued)

(58) Field of Classification Search
CPC .......... H02S 30/10; H02S 20/20; H02S 40/00; H02S 20/23; F24S 10/50; F24S 10/74; F24S 10/742; F24S 25/00; F24S 25/20; F24S 25/40; F24S 25/63; F24S 25/67; F24S 40/44; F24S 80/10; F24S 2025/014;
(Continued)

(56) References Cited

U.S. PATENT DOCUMENTS

2013/0298968 A1* 11/2013 Laitila .................. H02S 20/24
136/251

FOREIGN PATENT DOCUMENTS

TW      I741817 B    10/2021
TW      M617771 U    10/2021
(Continued)

*Primary Examiner* — Michael Y Sun
(74) *Attorney, Agent, or Firm* — Birch, Stewart, Kolasch & Birch, LLP (57) ABSTRACT

A solar panel bracket with a water conducting function for carrying a plurality of solar photovoltaic panels, comprising: a plurality of first brackets, each of the first brackets is arranged in parallel with each other, each of the first brackets has a first water conducting groove; a plurality of second brackets, each of the second brackets is arranged in parallel with each other, each of the second brackets has a second water conducting groove, the second brackets and the first brackets are arranged perpendicular to each other, and the second brackets and the first brackets surround to form a plurality of square spaces, the solar photovoltaic panels are arranged on the square spaces; and a plurality of third water conducting groove groups, each of the third water conducting groove groups is disposed on the side of each of the first brackets, and each of the third water conducting groove group has a third water conducting groove, and the second water conducting grooves communicate with the third water conducting grooves.

11 Claims, 9 Drawing Sheets

(51) Int. Cl.
     *H02S 40/00*      (2014.01)
     *F24S 80/00*      (2018.01)
     *F24S 80/10*      (2018.01)
     *F24S 25/00*      (2018.01)
     *F24S 10/70*      (2018.01)
     *F24S 25/67*      (2018.01)
     *F24S 25/20*      (2018.01)
     *F24S 25/63*      (2018.01)
     *F24S 25/40*      (2018.01)
     *F24S 40/44*      (2018.01)
     *F24S 10/50*      (2018.01)

(52) U.S. Cl.
     CPC ................ *F24S 40/44* (2018.05); *F24S 80/10* (2018.05); *F24S 2025/014* (2018.05); *F24S 2080/05* (2018.05); *H02S 40/00* (2013.01)

(58) Field of Classification Search
     CPC ...... F24S 2080/05; F24S 25/35; F24S 25/632; F24S 25/634; F24S 25/636; Y02E 10/50
     See application file for complete search history.

(56) References Cited

FOREIGN PATENT DOCUMENTS

| | | | |
|---|---|---|---|
| TW | M619480 U | | 11/2021 |
| TW | M620395 U | * | 12/2021 |
| TW | M620395 U | | 12/2021 |

* cited by examiner

SOLAR PANEL BRACKET WITH WATER CONDUCTING FUNCTION

FIELD OF TECHNOLOGY

The present invention relates to a solar panel bracket, and in particular to a solar panel bracket with a water conducting function.

BACKGROUND

Solar energy refers to energy from light and heat radiated from the sun which are utilized by a series of technologies that are constantly developing. Among them, the use of solar cells to convert the energy contained in sunlight into electrical energy through photoelectric conversion is one of the main application methods.

Solar equipment can be disposed on roofs, balconies, top floors, factories, open spaces, etc. Each solar panel of the solar equipment is disposed on a support bracket for support and positioning, but a gap would be formed between adjacent solar panel modules, causing that in rainy weather or when cleaning the solar panels, water can easily seep into the gaps, resulting in stagnant water and poor drainage.

In conventional technologies, a rubber strip is arranged between the solar panel modules, to provide waterproof effect. However, the rubber strips would cause elastic fatigue when exposed to the sunlight for a long time, so that the leakage prevention effect cannot be effectively achieved.

In addition, there are also conventional technologies to provide waterproof brackets for the solar modules, such as Taiwan's M620395, M617771, 1741817 and other patents, but these patents focus on solving the problem of waterproofing rather than water conduction.

There are other conventional technologies to provide water conducting steel brackets for the solar modules, such as the Taiwan's M619480 patent, but although the structures in these patents can conduct water, carrying capacity is affected due to the too simple structures, or they can only overcome the one-way (longitudinal or horizontal) water conduction, but cannot solve the problem of two-way (longitudinal and horizontal) water conduction.

SUMMARY

In order to solve the above and other problems, one objective of the present invention is to provide a solar panel bracket with a water conducting function.

Another objective of the present invention is to provide a solar panel bracket with a water conducting function which is capable of simultaneous longitudinal and horizontal water conduction.

A further objective of the present invention is to provide a solar panel bracket with a water conducting function which is capable of collecting longitudinal and horizontal falling water together into a same direction.

Another objective of the present invention is to provide a solar panel bracket with a water conducting function which is capable of quick or safe assembly.

In order to achieve the above and other objectives, provided in an embodiment of the present invention is a solar panel bracket with a water conducting function for carrying a plurality of solar photovoltaic panels, comprising: a plurality of first brackets, each of the first brackets is arranged in parallel with each other, each of the first brackets has a first water conducting groove; a plurality of second brackets, each of the second brackets is arranged in parallel with each other, each of the second brackets has a second water conducting groove, the second brackets and the first brackets are arranged perpendicular to each other, and the second brackets and the first brackets surround to form a plurality of square spaces, the solar photovoltaic panels are arranged on the square spaces; and a plurality of third water conducting groove groups, each of the third water conducting groove groups is disposed on the side of each of the first brackets, and each of the third water conducting groove group has a third water conducting groove, and the second water conducting grooves communicate with the third water conducting grooves.

In one embodiment, the third water conducting groove group includes a left third water conducting groove and a right third water conducting groove, the left third water conducting groove is disposed on the left side of the first bracket, and the right third water conducting groove is disposed on the right side of the first bracket.

In one embodiment, the first bracket has two first bracket female parts, the third water conducting groove group has two third water conducting groove male parts, and the third water conducting groove male parts are detachably clipped into the first bracket female parts.

In one embodiment, the second bracket is disposed above the third water conducting groove group, and the second water conducting groove is in communication with the third water conducting groove in a high and low manner.

In one embodiment, the present invention may further include a plurality of fixing devices, and the fixing devices cooperate with the first brackets to fix the solar photovoltaic panels.

In one embodiment, the first bracket has two sliding grooves, the fixing device has two sliding sheets and two fixing sheets, and the two sliding sheets are slidably disposed in the two sliding grooves.

In one embodiment, the fixing device further has a hook plate, and the hook plate is U-shaped with two wings extending inwards.

In one embodiment, the solar photovoltaic panel has two legs, and the two wings are movably hooked on the legs.

In one embodiment, the present invention may further include a basic bracket group with a plurality of uprights, wherein the heights of the uprights connected to the same second bracket are all the same, and the heights of the uprights connected to the different second brackets are different.

In one embodiment, the basic bracket group includes a first upright group and a second upright group, the first upright group and the second upright group are connected to different second brackets, and the height of the first upright group is greater than the second upright group, the basic bracket group includes a first upright group and a second upright group, the first upright group and the second upright group are connected to different second brackets, the height of the first upright group is greater than the second upright group.

In one embodiment, the outer side of the bottom of the second bracket has a second bracket side wing for setting and fixing the third water conducting groove group.

In one embodiment, the outer side of the top of the second bracket (20) has a second bracket blocking wing for movably blocking the legs.

DESCRIPTION OF THE EMBODIMENTS

Figure 1:
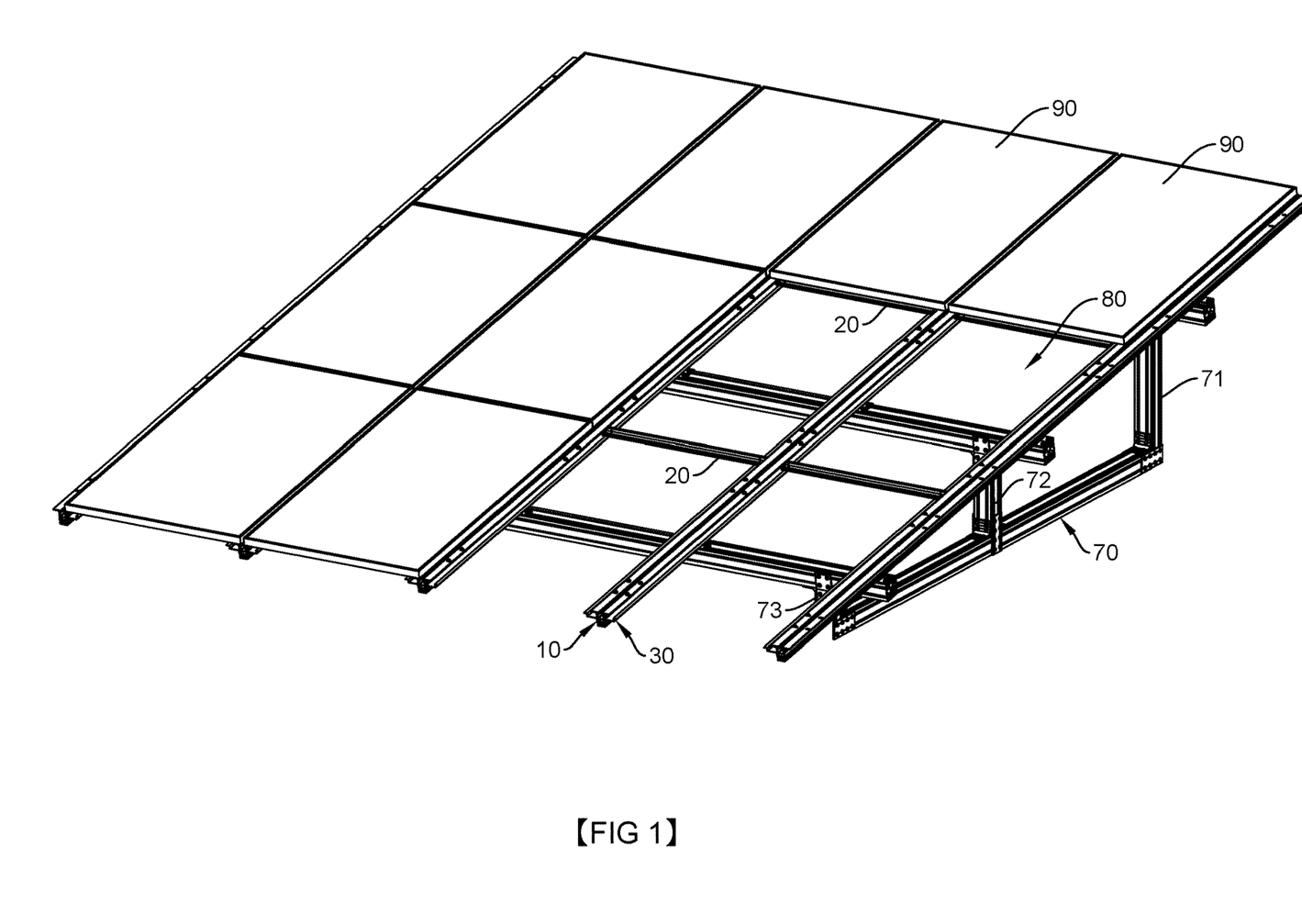
FIG. 1 is a schematic diagram showing the disassembly of the three-dimensional part in an embodiment of the present invention.

FIG. 1 is a schematic diagram showing the disassembly of the three-dimensional part in an embodiment of the present invention. Please refer to FIG. 1, disclosed in the present embodiment is a solar panel bracket with a water conducting function for carrying a plurality of solar photovoltaic panels (90), comprising: a plurality of first brackets (10), each of the first brackets (10) is arranged in parallel with each other, each of the first brackets (10) has a first water conducting groove (11); a plurality of second brackets (20), each of the second brackets (20) is arranged in parallel with each other, each of the second brackets (20) has a second water conducting groove (21), the second brackets (20) and the first brackets (10) are arranged perpendicular to each other, and the second brackets (20) and the first brackets (10) surround to form a plurality of square spaces (80), the solar photovoltaic panels (90) are arranged on the square spaces (80); and a plurality of third water conducting groove groups (30), each of the third water conducting groove groups (30) is disposed on the side of each of the first brackets (10), and each of the third water conducting groove group (30) has a third water conducting groove (31), and the second water conducting grooves (21) communicate with the third water conducting grooves (31).

Taking the direction of FIG. 1 as an example, when rainwater falls into a longitudinal gap between the solar photovoltaic panels (90), the rainwater would fall into the first water conducting groove (11). When the rainwater falls into a horizontal gap between the solar photovoltaic panels (90), the rainwater would fall into the second water conducting groove (21), and since the second water conducting groove (21) communicates with the third water conducting groove (31), rainwater would then fall into the third water conducting groove (31). Thereby, the embodiment of the present invention has the functions of water conduction and waterproof regardless of being in the longitudinal and horizontal directions.

Figure 2:
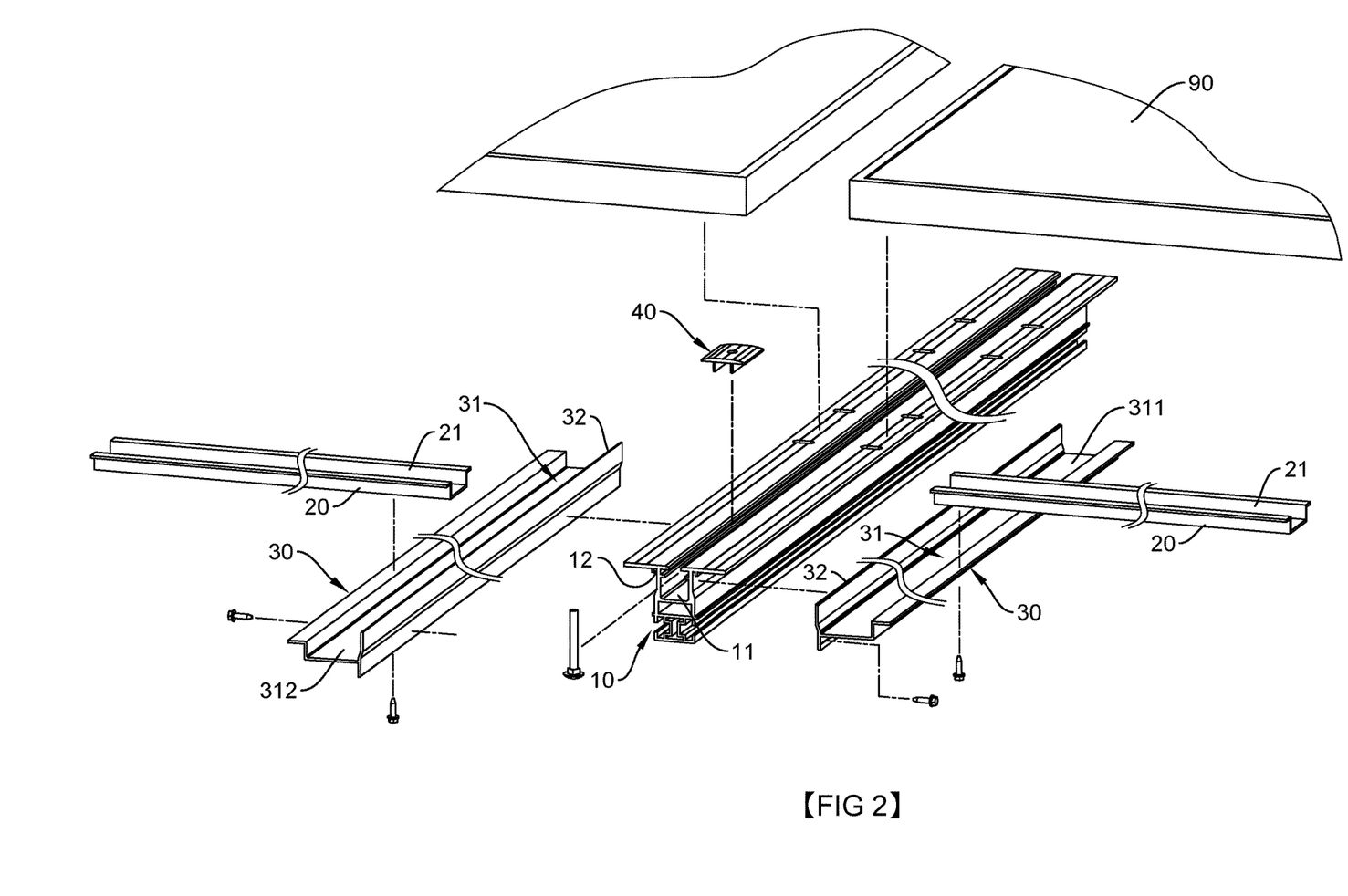
FIG. 2 is a three-dimensional exploded schematic diagram in the embodiment of FIG. 1.

FIG. 2 is a three-dimensional exploded schematic diagram in the embodiment of FIG. 1. Please refer to FIG. 2, taking the direction of FIG. 2 as an example, preferably, the third water conducting groove group (30) may include a left third water guiding groove (311) and a right third water conducting groove (312), the left third water conducting groove (311) is disposed on the left side of the first bracket (10), and the right third water conducting groove (312) is disposed on the right side of the first bracket (10). Thereby, the third water conducting groove group (30) can receive the rainwater from the left and right second water conducting grooves (21), so that all the rainwater in the longitudinal and horizontal directions is in the direction of the first water conducting groove (11), so as to facilitate subsequent centralized flow conduction and management.

Preferably, the first bracket (10) has two first bracket female parts (12), the third water conducting groove group (30) has two third water conducting groove male parts (32), and the third water conducting groove male parts (32) are detachably clipped into the first bracket female parts (12). Thereby, the first bracket (10) and the third water conducting groove group (30) can be temporarily and stably combined before being locked with cooperative screws, thereby improving the speed, convenience and safety of assembly.

Preferably, the second bracket (20) is disposed above the third water conducting groove group (30), and the second water conducting groove (21) is in communication with the third water conducting groove (31) in a high and low manner. Thereby, the second water conducting grooves (21) communicate with the third water conducting grooves (31).

Figure 3:
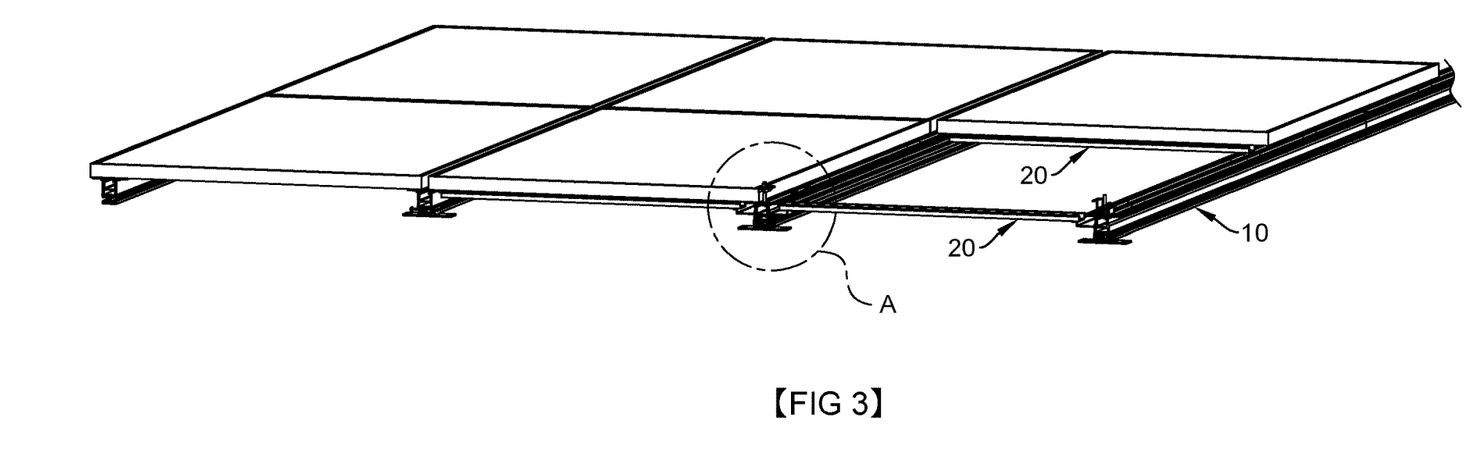
FIG. 3 is a schematic diagram of a position to be enlarged in the embodiment of FIG. 1.
Figure 4:
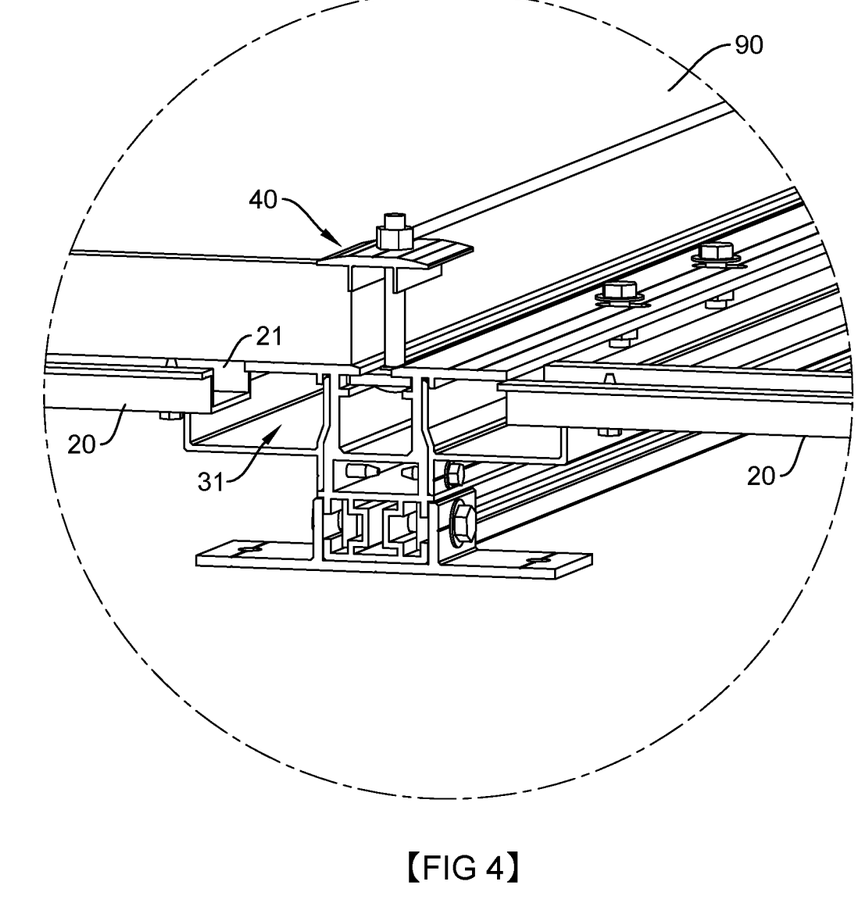
FIG. 4 is an enlarged three-dimensional schematic diagram of position A in the embodiment of FIG. 3.
Figure 5:
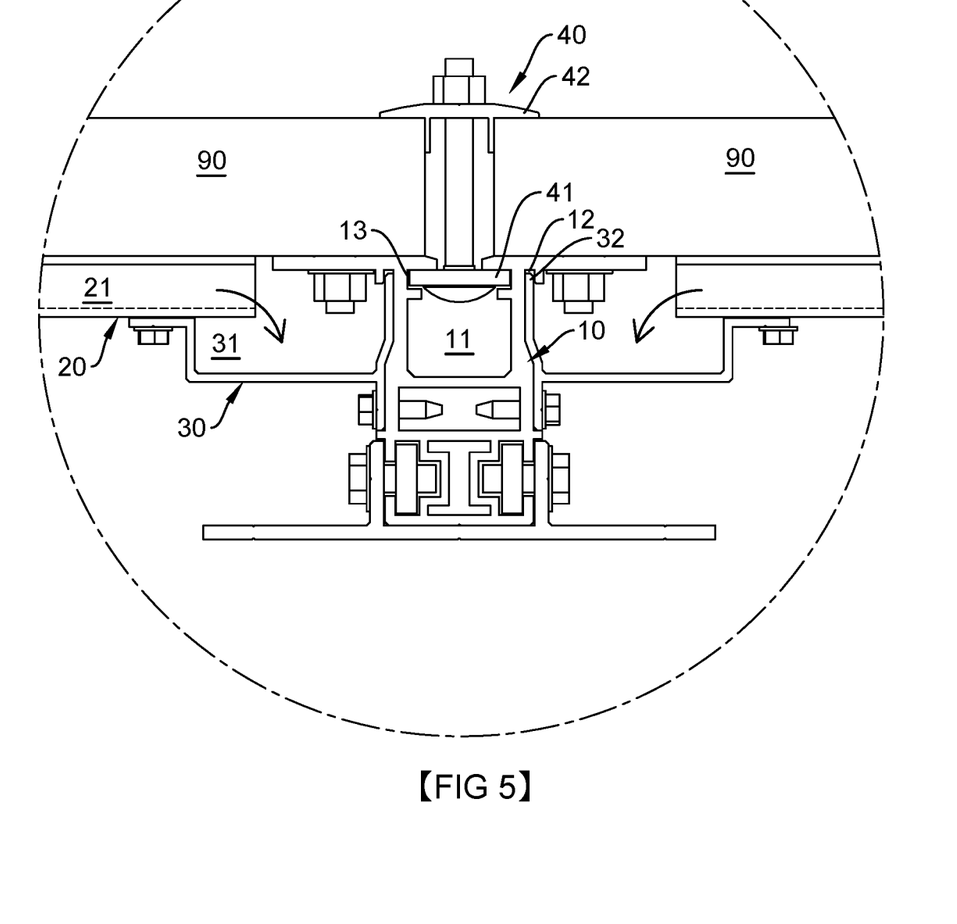
FIG. 5 is an enlarged cross-sectional schematic diagram of position A in the embodiment of FIG. 3.

FIG. 3 is a schematic diagram of a position to be enlarged in the embodiment of FIG. 1. FIG. 4 is an enlarged three-dimensional schematic diagram of position A in the embodiment of FIG. 3. FIG. 5 is an enlarged cross-sectional schematic diagram of position A in the embodiment of FIG. 3. Please refer to FIGS. 3 to 5 simultaneously, preferably, the present embodiment may further include a plurality of fixing devices (40), and the fixing devices (40) cooperate with the first brackets (10) to fix the solar photovoltaic panels (90). Thereby, the solar photovoltaic panels (90) can be temporarily and stably fixed before being locked with the cooperative screws, thereby improving the speed, convenience and safety of the assembly.

Preferably, the first bracket (10) has two sliding grooves (13), the fixing device (40) has two sliding sheets (41) and two fixing sheets (42), and the two sliding sheets (41) are slidably disposed in the two sliding grooves (13). Thereby, the fixing position of the fixing device (40) can be easily adjusted before being locked with the cooperative screw to provide better stress.

Figure 6:
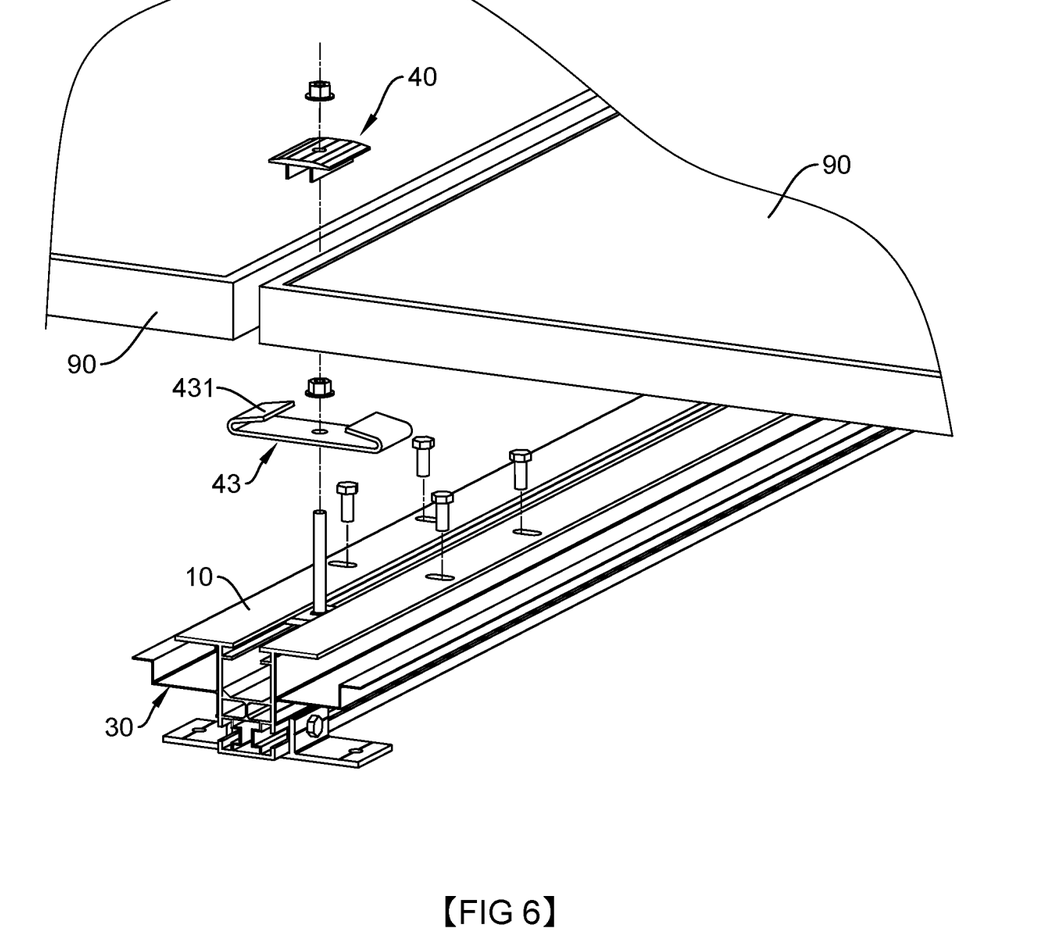
FIG. 6 is a three-dimensional exploded schematic diagram in another embodiment of the present invention.
Figure 7:
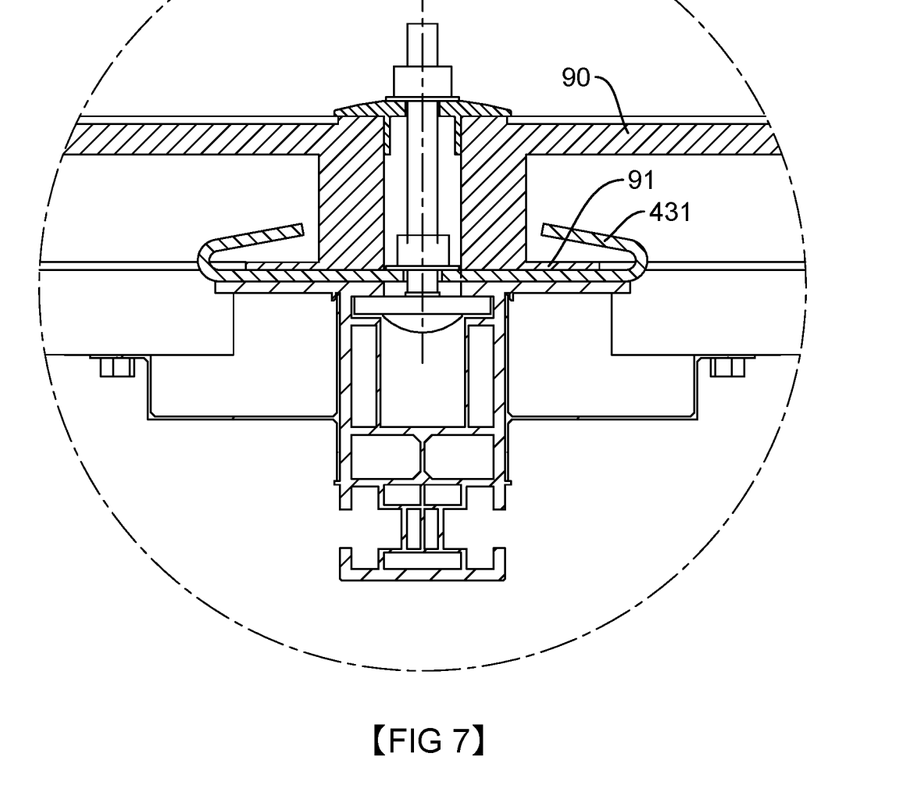
FIG. 7 is an enlarged cross-sectional schematic diagram in the embodiment of FIG. 6.

FIG. 6 is a three-dimensional exploded schematic diagram in another embodiment of the present invention. FIG. 7 is an enlarged cross-sectional schematic diagram in the embodiment of FIG. 6. Please refer to FIG. 6 and FIG. 7 again, preferably, the fixing device (40) may further have a hook plate (43), and the hook plate (43) is U-shaped with two wings (431) extending inwards. Preferably, the solar photovoltaic panel (90) has two legs (91), and the two wings (431) are movably hooked on the legs (91). Thereby, with the two wings (431) and the legs (91), the solar photovoltaic panels (90) can be temporarily and stably fixed before being locked with the cooperative screws, thereby improving the speed, convenience and safety of the assembly.

In addition, the fixing device (40) can be integrally formed, or as shown in the figure, it can be composed of components in different parts.

Please refer to FIG. 1 again, preferably, the present embodiment may further include a basic bracket group (70) with a plurality of uprights, wherein the heights of the uprights connected to the same second bracket (20) are all the same, and the heights of the uprights connected to the different second brackets (20) are different.

Describing from a different perspective, preferably, the basic bracket group (70) includes a first upright group (71) and a second upright group (72), the first upright group (71) and the second upright group (72) are connected to different second brackets (20), and the height of the first upright group (71) is greater than the second upright group (72). Thereby, the embodiment of the present invention can provide the solar panel bracket with a slope and a water conducting function, which has achieved a better water conducting effect.

By analogy, preferably, the basic bracket group (70) may include a third upright group (73), or more. Thereby, the embodiment of the present invention can stably provide the slope and support.

Figure 8:
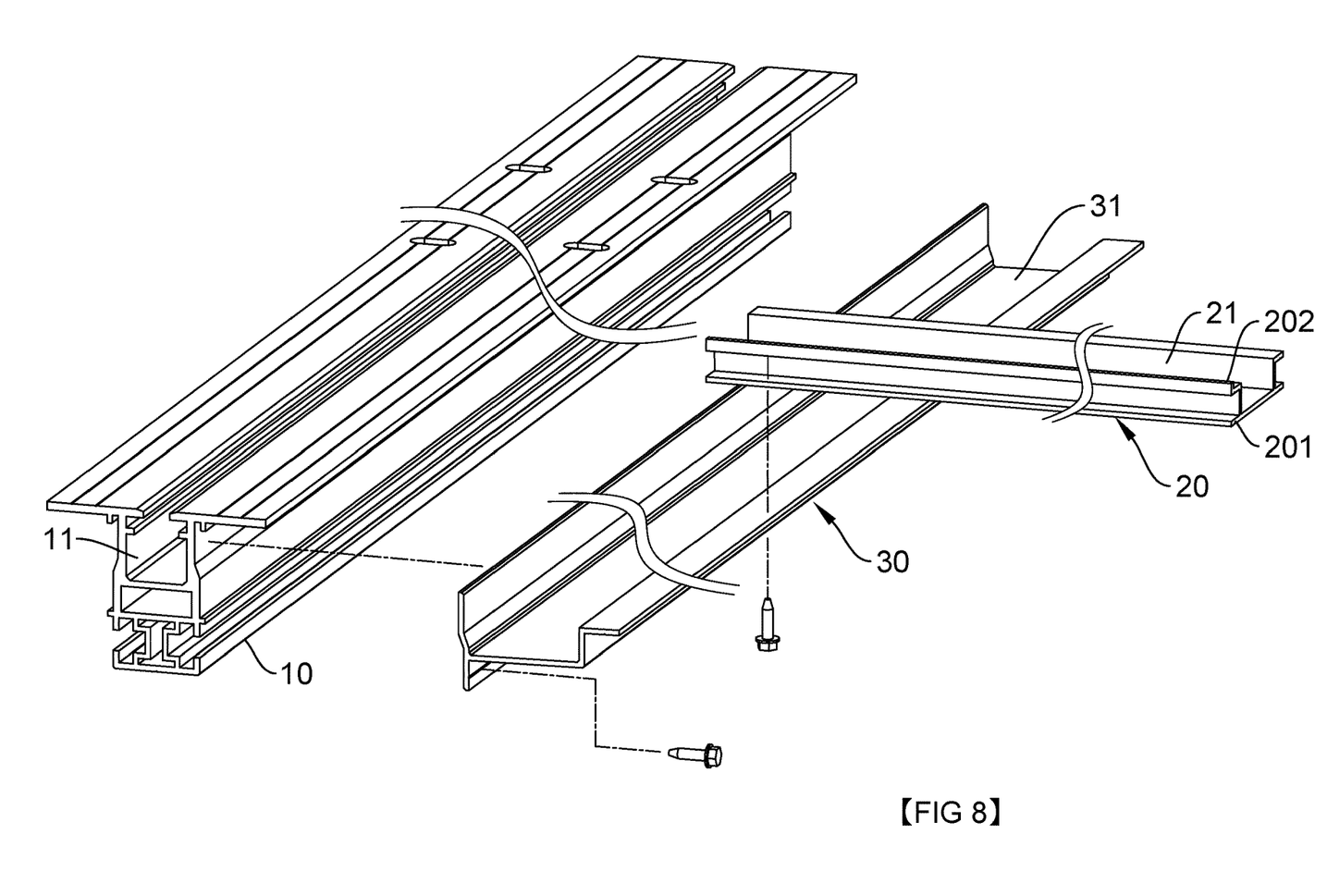
FIG. 8 is a three-dimensional exploded schematic diagram in another embodiment of the present invention.
Figure 9:
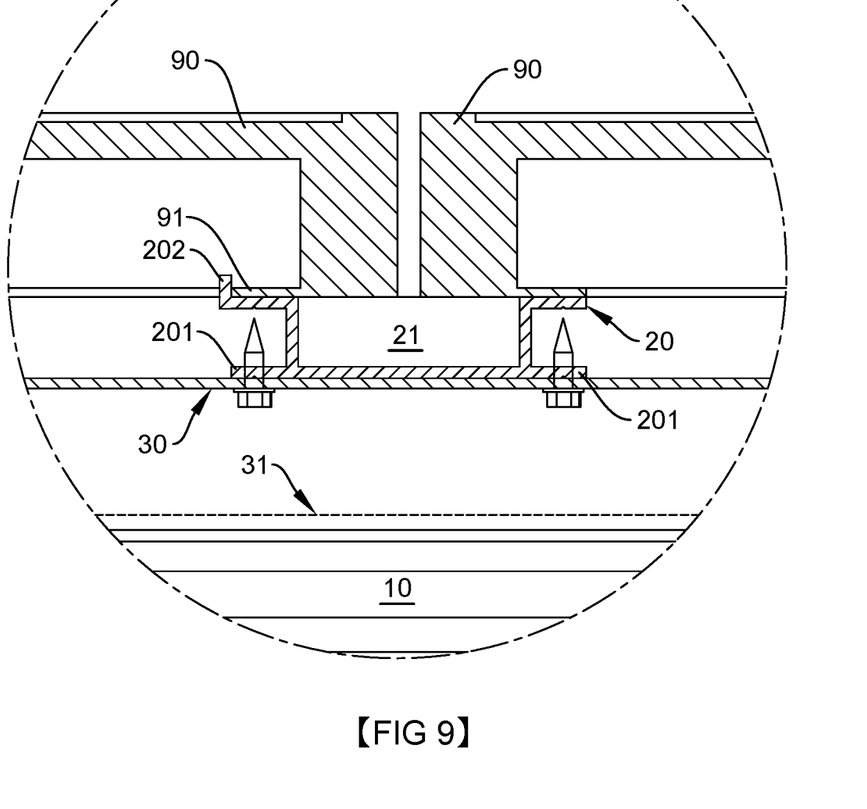
FIG. 9 is an enlarged cross-sectional schematic diagram in the embodiment of FIG. 8.

FIG. 8 is a three-dimensional exploded schematic diagram in another embodiment of the present invention. FIG. 9 is an enlarged cross-sectional schematic diagram in the embodiment of FIG. 8. Please refer to FIGS. 8 and 9, in order to strengthen the waterproof effect of the second bracket (20), preferably, the outer side of the bottom of the second bracket (20) may have a second bracket side wing (201), the second bracket side wing (201) can be screwed through by a screw. Thereby, the overall waterproof effect can be strengthened by avoiding directly passing through the second water conducting groove (21).

Similarly, the first bracket (10) and the third water conducting groove group (30) can also have similar flanks, which will not be repeated here.

In addition, the outer side of the top of the second bracket (20) may have a second bracket blocking wing (202), which can movably block the two legs (91), so that the solar photovoltaic panels (90) can be temporarily and stably fixed, thereby improving the speed, convenience and safety of the assembly.

To sum up, through the cooperation of the first bracket, the second bracket and the third water conducting groove group, the embodiment of the present invention can provide the solar panel bracket with the water conducting function, which can conduct water longitudinally and horizontally at the same time, or collect longitudinal and horizontal falling water together into the same direction. In addition, the solar panel bracket with the water conducting function provided in the embodiment of the present invention is capable of quick or safe assembly.

DESCRIPTION OF SYMBOLS a first bracket (10)
a first water conducting groove (11)
a first bracket female part (12)
groove (13)
a second bracket (20)
a second bracket side wing (201)
a second bracket blocking wing (202)
a second water conducting groove (21)
a third water conducting groove group (30)
a third water conducting groove (31)
a left third water conducting groove (311)
a right third water conducting groove (312)
a third water conducting groove male part (32)
a fixing device (40)
a sliding sheet (41)
a fixing sheet (42)
a hook plate (43)
a swing (431)
a basic bracket group (70)
a first upright group (71)
a second upright group (72)
a third upright group (73)
a square space (80)
a solar photovoltaic panel (90)
a leg (91)

What is claimed is:

1. A solar panel bracket with a water conducting function for carrying a plurality of solar photovoltaic panels (90), comprising:
   a plurality of first brackets (10), each of the first brackets (10) is arranged in parallel with each other, each of the first brackets (10) has a first water conducting groove (11);
   a plurality of second brackets (20), each of the second brackets (20) is arranged in parallel with each other, each of the second brackets (20) has a second water conducting groove (21), the second brackets (20) and the first brackets (10) are arranged perpendicular to each other, and the second brackets (20) and the first brackets (10) surround to form a plurality of square spaces (80), the solar photovoltaic panels (90) are arranged on the square spaces (80); and
   a plurality of third water conducting groove groups (30), each of the third water conducting groove groups (30) is disposed on the side of each of the first brackets (10), and each of the third water conducting groove group (30) has a third water conducting groove (31), and the second water conducting grooves (21) communicate with the third water conducting grooves (31),
   wherein the solar panel bracket further includes a plurality of fixing devices (40), and the fixing devices (40) cooperate with the first brackets (10) to fix the solar photovoltaic panels (90).

2. The solar panel bracket with a water conducting function as claimed in claim 1, wherein the third water conducting groove group (30) includes a left third water conducting groove (311) and a right third water conducting groove (312), the left third water conducting groove (311) is disposed on the left side of the first bracket (10), and the right third water conducting groove (312) is disposed on the right side of the first bracket (10).

3. The solar panel bracket with a water conducting function as claimed in claim 1, wherein the first bracket (10) has two first bracket female parts (12), the third water conducting groove group (30) has two third water conducting groove male parts (32), and the third water conducting groove male parts (32) are detachably clipped into the first bracket female parts (12).

4. The solar panel bracket with a water conducting function as claimed in claim 1, wherein the second bracket (20) is disposed above the third water conducting groove group (30), and the second water conducting groove (21) is in communication with the third water conducting groove (31) in a high and low manner.

5. The solar panel bracket with a water conducting function as claimed in claim 1, wherein the first bracket (10) has two sliding grooves (13), the fixing device (40) has two sliding sheets (41) and two fixing sheets (42), and the two sliding sheets (41) are slidably disposed in the two sliding grooves (13).

6. The solar panel bracket with a water conducting function as claimed in claim 1, wherein the fixing device (40) further has a hook plate (43), and the hook plate (43) is U-shaped with two wings (431) extending inwards.

7. The solar panel bracket with a water conducting function as claimed in claim 6, wherein the solar photovoltaic panel (90) has two legs (91), and the two wings (431) are movably hooked on the legs (91).

8. The solar panel bracket with a water conducting function as claimed in claim 1, wherein the solar panel bracket further includes a basic bracket group (70) with a plurality of uprights, wherein the heights of the uprights connected to the same second bracket (20) are all the same, and the heights of the uprights connected to the different second brackets (20) are different.

9. The solar panel bracket with a water conducting function as claimed in claim 8, wherein the basic bracket group (70) includes a first upright group (71) and a second upright group (72), the first upright group (71) and the second upright group (72) are connected to different second brackets (20), and the height of the first upright group (71) is greater than the second upright group (72).

10. The solar panel bracket with a water conducting function as claimed in claim 1, wherein the outer side of the bottom of the second bracket (20) has a second bracket side wing (201) for setting the third water conducting groove group (30).

11. The solar panel bracket with a water conducting function as claimed in claim 7, wherein the outer side of the top of the second bracket (20) has a second bracket blocking wing (202) for movably blocking the legs (91).

\* \* \* \* \*